United States Patent
Huggler

(12) 
(10) Patent No.: US 6,350,970 B1
(45) Date of Patent: Feb. 26, 2002

(54) APPLIANCE SWITCHING MECHANISM AND METHOD

(75) Inventor: Peter Huggler, Columbia, MO (US)

(73) Assignee: Salton, Inc., Mount Prospect, IL (US)

( * ) Notice: Subject to any disclaimer, the term of this patent is extended or adjusted under 35 U.S.C. 154(b) by 0 days.

(21) Appl. No.: 09/307,080

(22) Filed: May 7, 1999

(51) Int. Cl.[7] .............................................. A47J 37/08
(52) U.S. Cl. ........................ 219/514; 219/521; 99/338; 99/390; 200/1 A; 200/283
(58) Field of Search .................. 219/514, 519, 219/521, 385; 99/327, 391–392, 393, 399, 338; 200/1 TK, 1 A, DIG. 46, 283, 245–247, 238

(56) References Cited

U.S. PATENT DOCUMENTS

| | | | | |
|---|---|---|---|---|
| 3,719,788 A | * | 3/1973 | Holland et al. | 200/569 |
| 3,849,611 A | * | 11/1974 | Walker, Jr. | 200/5 A |
| 3,870,840 A | * | 3/1975 | Rivetta et al. | 200/5 A |
| 3,971,902 A | * | 7/1976 | Wulf et al. | 200/5 A |
| 4,010,339 A | * | 3/1977 | Owen et al. | 200/292 |
| 4,144,428 A | * | 3/1979 | Voegelin | 200/283 |
| 4,178,498 A | | 12/1979 | Snyder | 219/413 |
| 4,197,437 A | * | 4/1980 | Michalski | 200/406 |
| 4,395,621 A | | 7/1983 | Parker | 219/492 |
| 4,428,649 A | * | 1/1984 | Main et al. | 200/283 |
| 4,755,656 A | * | 7/1988 | Charlesworth et al. | 99/328 |
| 5,018,437 A | * | 5/1991 | Juan | 99/327 |
| 5,044,263 A | | 9/1991 | Birkert et al. | 99/327 |
| 5,977,497 A | * | 11/1999 | Tsunematsu | 200/283 |
| 6,014,925 A | * | 1/2000 | Basora et al. | 99/391 |
| 6,230,611 B1 | * | 5/2001 | Mauffrey | 99/327 |

FOREIGN PATENT DOCUMENTS

| | | | |
|---|---|---|---|
| DE | 2658997 | * | 6/1978 |
| DE | 3020778 | * | 12/1981 |
| DE | 19606507 | * | 8/1997 |
| EP | 23 724 | | 2/1981 |

* cited by examiner

*Primary Examiner*—John A. Jeffery
(74) *Attorney, Agent, or Firm*—Dorsey & Whitney LLP

(57) ABSTRACT

A switching mechanism is utilized in a heating appliance, such as a toaster, that includes a bread support that supports a food item to insert and remove the food item from a cooking cavity of the appliance. The appliance includes an electronic circuit that controls operation during a heating cycle. The switching mechanism includes a switch having a first terminal adapted to receive a power signal and a second terminal coupled to the electronic circuit. The switch operates responsive to an applied switching force to couple the first terminal to the second terminal and thereby apply power to the electronic circuit. A switch actuator has a first end, a second end, and a retaining member near the second end. The second end is attached to the appliance to rotate about an axis. The switch actuator operates responsive to a force being applied to the bread support to rotate about the axis to a first position and apply the switching force to the switch so power is applied to the electronic circuit. A retaining force is applied to the first end of the actuator to secure the actuator in the first position responsive to power being applied to the electronic circuit and the retaining member engages the bread support to hold the bread support with the food item positioned in the cooking cavity when the actuator is in the first position. The switch actuator operates responsive to the retaining force being removed to rotate about the axis to remove the switching force and thereby remove power from the electronic circuit to terminate the heating cycle. Various other aspects of the present invention are directed, for example, to contacts formed on a printed circuit board and switch blades formed separate from the printed circuit board, heat-staking of the switch blades, and crimp details on the switch blades that eliminates the need for wire terminals.

29 Claims, 8 Drawing Sheets

APPLIANCE SWITCHING MECHANISM AND METHOD

TECHNICAL FIELD

The present invention relates generally to heating appliances, such as toasters or toaster ovens, and more specifically to a switch mechanism for such appliances' bread support.

BACKGROUND OF THE INVENTION

In heating appliances, such as toasters and toaster ovens, a food item is placed on a bread support that supports the food item as it is lowered into and removed from a bread cavity of the appliance. FIG. 1 is an isometric view of a conventional toaster 10 with its external housing (not shown) removed to better illustrate the internal components of the toaster 10. The toaster 10 includes a shell 14 formed from two side panels 16, 17, two end panels 18, 20, and a bottom 22 that are secured to each other by suitable means. An outer bread guard 26 is positioned inside the side panel 16 and an identical outer bread guard 28 is positioned inside the side panel 17. Two inner bread guards 32 and 34 are also positioned between the outer guards 26 and 28. Each of the bread guards 26—34 includes a horizontal member 36 and vertical members 38. A first bread cavity 40 is defined between the bread guards 26 and 32, and a second bread cavity 42 is defined between the bread guards 28 and 34. The bread guards 26–34 function to protect bread placed between the bread guards from heating elements (not shown in FIG. 1) positioned inside the side panels 16 and 17 as well as between the center bread guards 32 and 34.

A first bread support (not shown) is contained within the first bread cavity 40 and functions to support a piece of bread as it is lowered into and raised from the bread cavity 40. A second bread support (not shown) is similarly positioned within the second bread cavity 42 to support another piece of bread in the bread cavity 42. Each of the bread supports includes a lever 46, 48 extending through respective slots 50 and 52 in the end panel 18. The levers 46, 48 are coupled to respective slides 56, 58 that slide on respective vertically oriented rods 60, 62. The slides 56, 58 are straddled by respective brackets 74, 76 that also slide along the respective rods 60, 62. The brackets 74, 76 are coupled to an actuating handle 78 positioned outside the housing (not shown). The toaster 10 further includes an edge panel 80 positioned at the bottom of the end panel 18. A switch mechanism and retainer 82 is mounted on the edge panel 80.

In operation, the actuating handle 78 is pushed down to cause the brackets 74, 76 to slide downwardly on the respective rods 60, 62. As the brackets 74, 76 slide downwardly, they perform two functions. First, the brackets 74, 76 allow their respective slides 56, 58 to move downwardly until they contact respective stops (not shown in FIG. 1). The slides 56, 58 allow the levers 46, 48 to move downwardly to lower the bread on the bread supports in the bread cavities 40, 42. As the levers 46, 48 are pushed down, the outer bread guards 26, 28 move toward the center of the corresponding bread cavity 40, 42, as shown for the bread guard 28. In this way, the bread guards 26–34 position the bread in approximately the centers of the bread cavities 40 and 42 so that the bread placed on the bread supports is not positioned too close to the heating elements.

Second, when the brackets 74, 76 reach their lower positions, they actuate a switch (not shown) in the switch mechanism and retainer 82 to apply power to the heating elements of the toaster 10 during a heating cycle. The brackets 74, 76 are held in their lowered position during the heating cycle by an electromagnet (not shown) in the switch mechanism and retainer 82. At the end of the heating cycle, the electromagnet releases the brackets 74, 76, thereby allowing the brackets 74, 76 to be pulled upwardly by a spring (not shown in FIG. 1) extending between the brackets 74, 76 and a fixed location on the toaster 10. As the brackets 74, 76 move up, they raise the slides 56, 58, respectively, which, in turn, raise the respective levers 46, 48 thereby raising the bread supports in the bread cavities 40, 42, respectively. Although the switch mechanism and retainer 82 is described as controlling the toasting time, one skilled in the art will realize that other mechanisms such as a mechanical heat sensing mechanism may also be utilized.

FIGS. 2A–2C are schematic diagrams showing one of the brackets 74 and associated components to illustrate the operation of the toaster 10 bread support. Referring to FIG. 2A, the bread support bracket 74 includes a top leg 92, a side leg 94 and a bottom leg 96. The top leg 92 and the bottom leg 96 are formed to slide along the rod 60. A spring 98 is connected between one of the legs 92–96 and a fixed structure of the toaster such as the end panel 18 (FIG. 1). In FIG. 2A, the spring 98 is connected to the top leg 92, and functions to apply a return force $F_R$ to the bread support bracket 74 biasing the bread support bracket 74 towards a top end 100 of the rod 60. The bracket 74 is shown in FIG. 2A in its OFF position before the handle 78 (FIG. 1) has been actuated downwardly to begin a heating cycle. In this position, the slide 56, which is connected to the bread support, rests on an upper surface of the bottom leg 96. The slide 56 thus maintains the bread support in its upper position.

In FIG. 2B, an external force $F_E$ is applied to the bread support bracket 74 sliding the bracket 74 bread support towards a bottom end 102 of the rod 60. As the bread support bracket 74 slides along the rod 60, the slide 56 carrying the bread support is allowed to move downwardly along the rod 60 towards the bottom end 102. The slide 56 continues to move downwardly until it contacts a stop 110, which is shown in FIG. 2B. Although a discrete stop 11 is shown in FIG. 2B, it will be understood that the stop 110 may be implemented in other ways such as limiting the downward movement of the bread support. After the slide 56 contacts the stop 110, the bracket 74 may continue to be displaced downwardly because the upper leg 92 is spaced from the lower leg 96 by a distance that is greater than the height of the slide 56. However, when the upper leg 92 of the bracket 74 contacts the slide 56 as shown in FIG. 2B, the bracket 74 has reached its lower-most position. In this position, the bracket 74 closes a switch (not shown) in the switch mechanism and retainer 82 to causing power to be applied to electronic circuitry and thereby initiating a heating cycle of the toaster 10. When power is supplied to the electronic circuitry, a coil (not shown) is energized and generates a retaining force $F_C$ that secures the bracket 74 in the position shown in FIG. 2B during the heating cycle of the toaster 10. The retaining force $F_C$ generated by the coil must be greater than the return force $F_R$ from the spring 98 in order to hold the bracket 74 at the desired position.

As shown in FIG. 2C, at the end of the heating cycle, which is determined by a timer (not shown) in the switch mechanism and retainer 82, the electromagnet removes the retaining force $F_C$, thereby allowing the spring 98 to slide the bracket 74 upwardly along the rod 60. The lower leg 96 of the bracket 74 then contacts the slide 56 to raise the slide 56, and hence the bread support, along with the bracket 74 to the OFF position shown in FIG. 2A.

As is well known in the art, it is possible for a food item to get caught in the bread cavity 40 during a heating cycle. In such cases, the food item can prevent the bread support from being carried upwardly by the spring 98 coupled through the bracket 74. The bracket 74 and slide 56 will then be stuck in the position shown in FIG. 2C. However, even though the stuck slide 56 prevents the bracket 74 from moving upwardly to the OFF position shown in FIG. 2A, the bracket 74 is able to move from the ON position shown in FIG. 2B to the stuck position shown in FIG. 2C. The upward movement of the bracket 74 to the stuck position is sufficient to allow the bracket 74 to deactivate the switch in the switch mechanism and retainer 82. Thus, power is removed from the toaster 10 even if the slide 56 becomes jammed in its downward position. If the spacing between the top and bottom legs 92, 96, respectively, of the bracket 74 was not greater than the height of the slide 56, a stuck bread support slide 56 could hold the bracket 74 in the down position to maintain the switch in the switch mechanism and retainer 82 closed and thereby causing power to be continually applied to the toaster. In this situation, the toaster 10 could become dangerously hot.

One problem with the conventional toaster 10 is that the return force $F_R$ exerted by the spring 98 when the bread support bracket 74 is in its lowered position is relatively large. Thus, a large coil is required to generate the retaining force $F_C$ having a magnitude greater than the return force $F_R$. A large coil is typically more expensive than a smaller coil, and thus increases the cost of the toaster. The manufacturing volumes of conventional toasters may be very large, and thus a more expensive coil in each toaster may result in the expenditure of a large sum of money. Furthermore, size constraints within a typical toaster may be rather limited and a large coil occupies valuable space. For example, the coil must typically be mounted on a printed circuit board containing the electronic circuitry that controls operation of the toaster. A large coil occupies valuable space on the printed circuit board and thereby limits the other circuitry that can be placed on the printed circuit board or increases the size and cost of the printed circuit board.

Some conventional toasters using electronic timing and control circuits use a mechanical latch to maintain the bread support in the down position during the heating cycle. The heating cycle is terminated by an electronic timing circuit driving a solenoid coil to cause the solenoid to release the latch. When the latch is released, the bread support rises and the switch is opened to remove power from the heating elements of the toaster. Unfortunately, if the timing circuit or solenoid fails for some reason, the latch will not be released, thereby indefinitely prolonging the heating cycle and potentially creating a fire hazard.

Other aspects of conventional toasters also unduly increase the manufacturing cost of such toasters. For example, the need to solder power wires to switching, timing and retainer sub-components, the relatively large size of circuit boards used in the switching and timing circuits of electronic toasters, and the assembly of components in switching, timing and retainer subcomponents all markedly increase the cost of manufacturing toasters.

There is a need for a switching, timing and retainer mechanism that reduces the magnitude of the force required to hold a bread support in a desired position during a heating cycle of the appliance, that terminates rather than prolongs the heating cycle in the event of a component failure, and that can be manufactured relatively inexpensively.

SUMMARY OF THE INVENTION

According to one aspect of the present invention, a switching mechanism for a heating appliance including a bread support adapted to support a food item to insert and remove the food item from a cooking cavity of the appliance. The appliance includes an electronic circuit that controls operation during a heating cycle. The switching mechanism includes a switch having a first terminal adapted to receive a power signal and a second terminal coupled to a component of the heating appliance. The switch operates responsive to an applied switching force to couple the first terminal to the second terminal. A switch actuator has a first end, a second end, and a retaining member spaced apart from the first end. The second end is attached to the appliance to rotate about an axis. The switch actuator operates responsive to a force being applied to the bread support to rotate about the axis to a first position and apply the switching force to the switch so power is applied to the component of the heating appliance. The retaining member engages the bread support to maintain the bread support in a lowered positioned in the cooking cavity when the actuator is in the first position. A retaining mechanism applies a retaining force to the first end of the switch actuator to secure the switch actuator in the first position responsive to power being applied to the component of the heating appliance. The retaining mechanism removes the retaining force at the end of the heating cycle to allow the switch actuator to rotate about the axis to remove the switching force and thereby remove power from the component of the heating appliance.

According to a second aspect of the present invention, a printed circuit board includes a substrate and at least one electrical contact formed on the substrate. The electrical contact is connected to electronic circuitry formed on the substrate. The electronic circuitry operates to control the operation of a heating appliance. A switch blade is provided for each electrical contact. Each of the switch blades is adapted to receive a power signal and is physically separate from the printed circuit board. Each switch blade is operable to touch the corresponding electrical contact to apply power through the contact to the electronic circuitry. According to a further aspect of the present invention, a switching mechanism for a toaster comprises a plurality of switch blades, each of the plurality of switch blades being adapted to receive a power signal and apply the power signal to a corresponding contact coupled to a component of the toaster. Each of the switch blades has a first end secured between a first mounting structure and a second mounting structure. The second mounting structure is heat-staked to the first mounting structure.

According to yet another aspect of the present invention, a switching mechanism for a toaster includes a plurality of switch blades, each of the plurality of switch blades being adapted to receive a power signal and apply the power signal to a corresponding contact coupled to a component of the toaster. Each of the switch blades includes a first end having crimp details formed at the first end. The crimp details are adapted to crimp an electrical wire that provides the corresponding power signal to the switch blade.

DETAILED DESCRIPTION OF THE INVENTION

Figure 1:
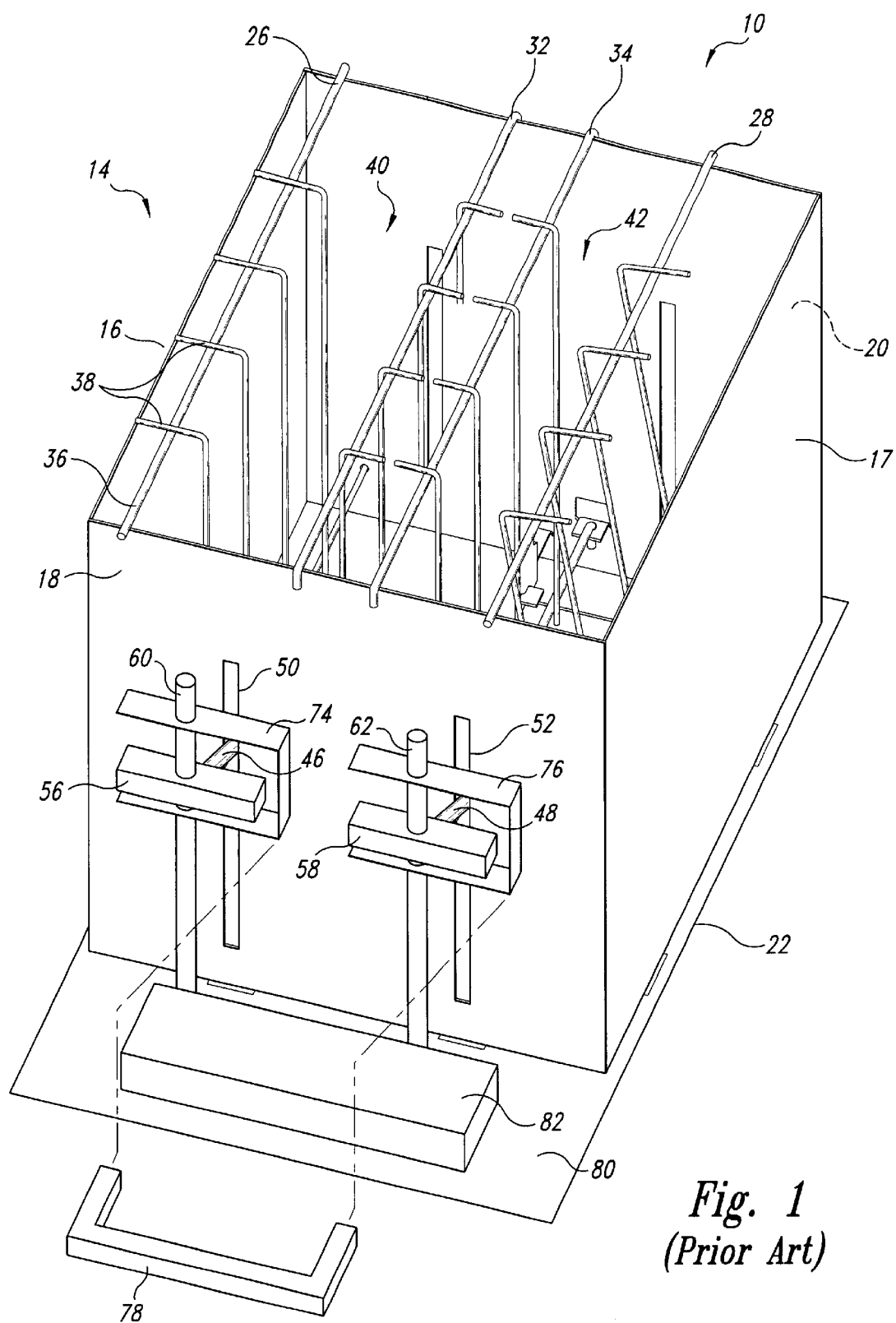
FIG. 1 is an isometric view of a conventional toaster including a conventional switch actuating and retaining mechanism.
Figure 2C:
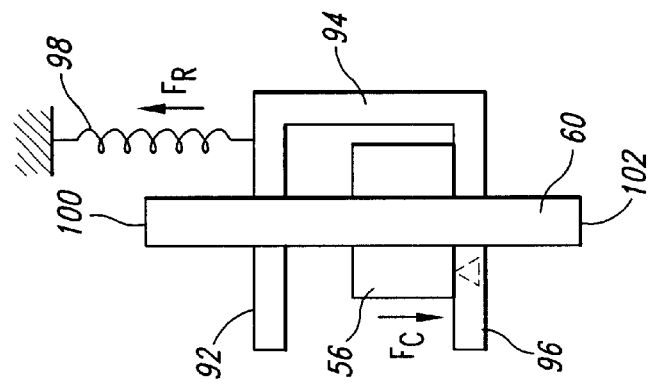
FIGS. 2A–2C are schematic diagrams illustrating the operation of the conventional toaster of FIG. 1.
Figure 2B:
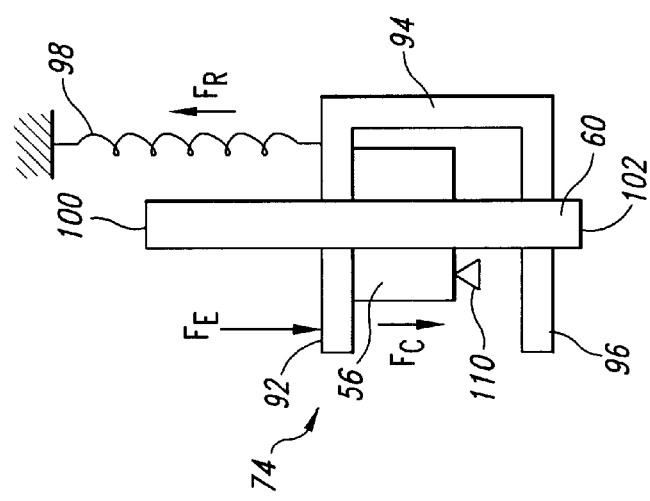
Figure 2A:
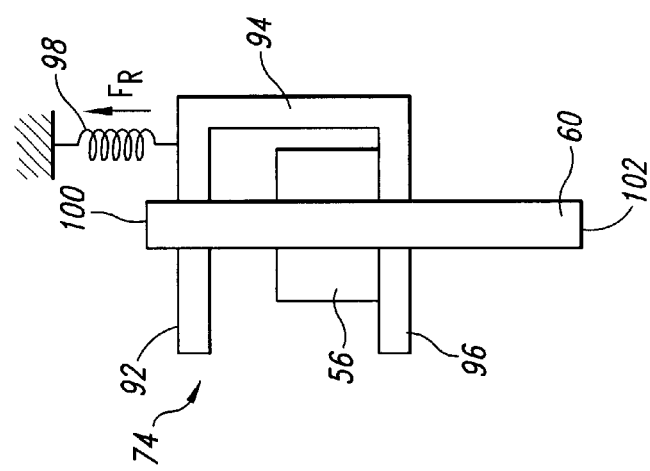
Figure 3:
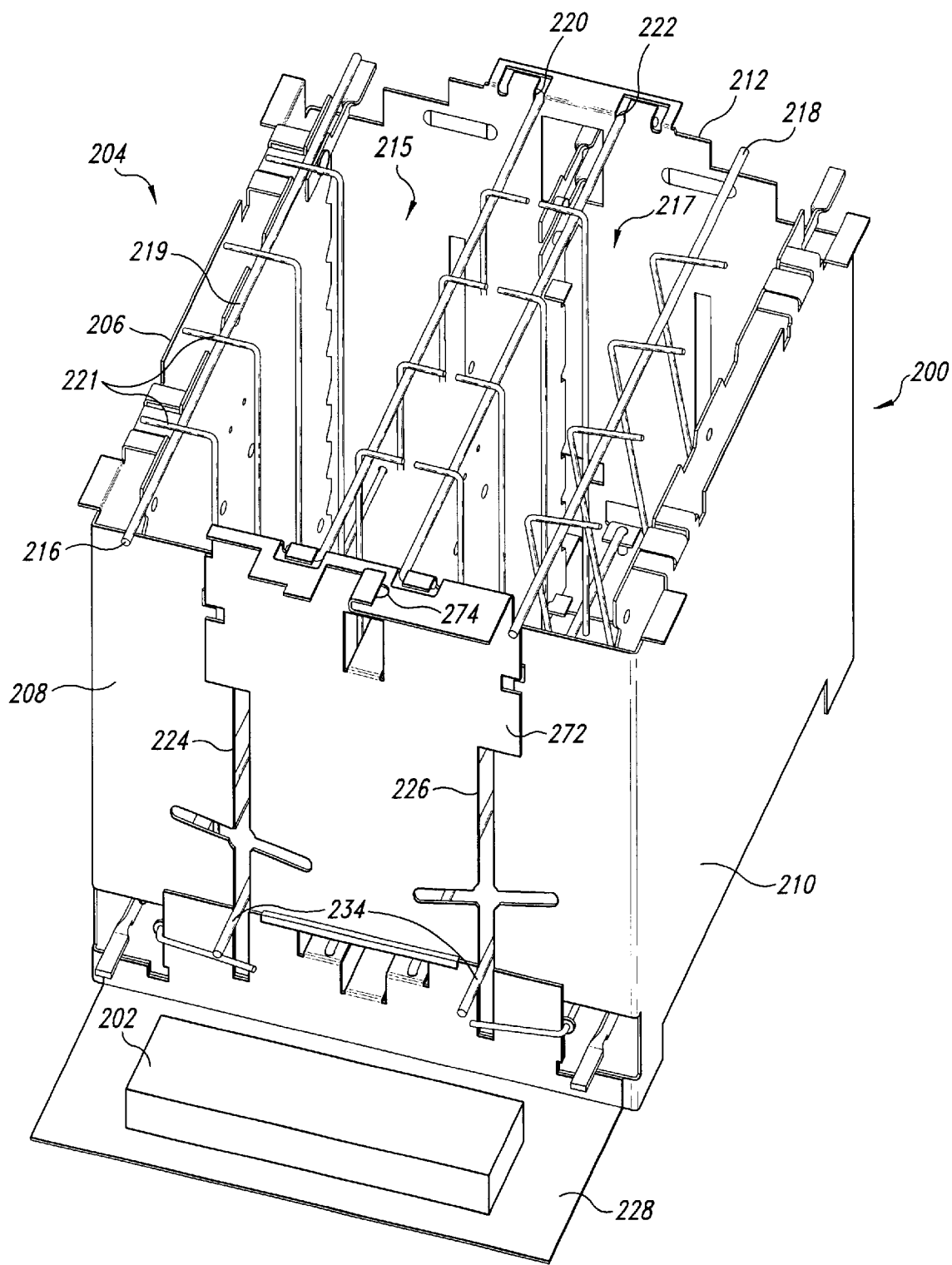
FIG. 3 is an isometric view of a toaster including a switch actuating and retaining mechanism according to one embodiment of the present invention.

FIG. 3 is an isometric view of a toaster 200 including a switch actuating and retaining mechanism 202 according to one embodiment of the present invention. The toaster 200 includes many of the same components found in the conventional toaster shown in FIG. 1, although their configuration may be somewhat different. Therefore, in the interests of brevity, a discussion of these components will not be repeated. Instead, what will be principally described is an actuating and retaining mechanism 202 used in the toaster 200. This actuating and retaining mechanism 202 is mounted on an edge panel 228 positioned at the bottom of an end panel 208. The end panel 208 includes a carriage support bracket 272 having a hole 274 adapted to receive a vertical rod (not shown). A bread carriage (not shown) slides along the vertical rod to raise and lower bread supports in the toaster 200, as will be described in more detail below.

Figure 4:
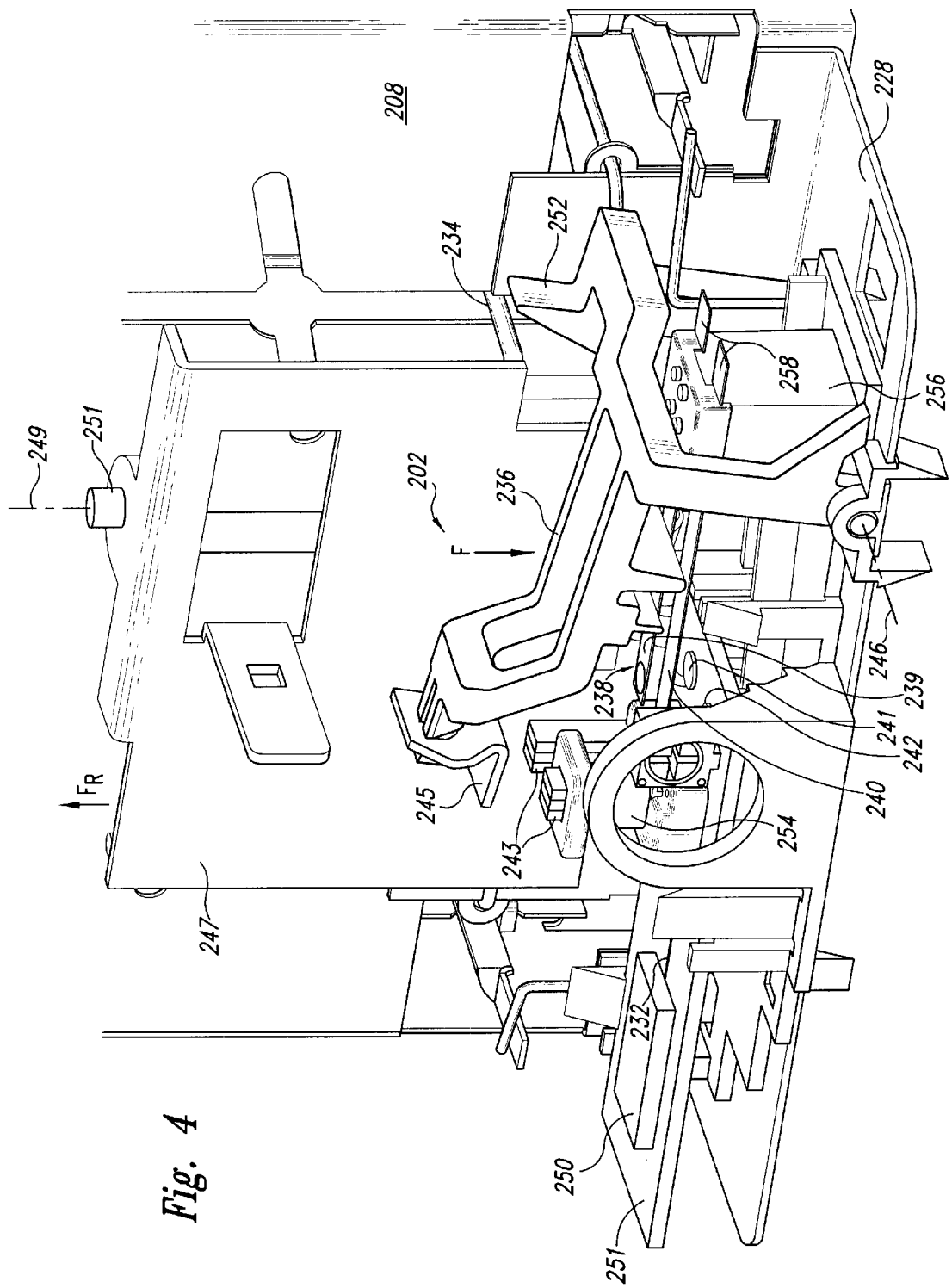
FIG. 4 is an isometric view of the switch actuating and retaining mechanism of FIG. 3.

With reference to FIG. 4, an actuating and retaining mechanism 202 includes a contact lever 236 and a contact assembly 238, which includes first and second electrically conductive resilient blades 239, 240 that are selectively coupled to respective contacts 241 and 242, as explained below. Each of the resilient blades 239, 240 has one end attached to a mounting block 256, and each includes a tab 258 adapted to receive a power signal. The contact lever 236 rotates about an axis 246 in a counterclockwise direction in response to a force F applied by a carriage 247. The carriage 247 is connected to an external actuating handle (not shown in FIG. 4) that is pushed down to move the carriage 247 down along the end panel 208. The carriage 247 is connected to a pair of levers 234 of first and second bread supports, and slides along an axis 249 of a rod 251 to lower and raise the bread supports. Referring back to FIG. 3, the rod 251 is vertically positioned between the edge panel 228 and the hole 274 in the carriage support bracket 272. A spring (not shown) applies a return force $F_R$ to slide the carriage 247 toward the top of the toaster 200, as will be discussed in more detail below.

In operation, an external force is applied to the external actuating handle to lower the carriage 247 which, in turn, applies the force F to a portion (not shown) of the contact lever 236. In response to the force F, the contact lever 236 rotates counter-clockwise forcing the blades 239, 240 against the contacts 241, 242, respectively, to apply power to the heating elements of the toaster 200 and electronic circuit 250.

The electronic circuit 250 is formed on a printed circuit board 251 and coupled through conductive lines 232 to receive power from the contacts 241, 242. When power is applied to the electronic circuit 250, the circuit 250 energizes an electromagnetic coil 254 that generates a magnetic field in an armature 243 and de-energizes the coil a predetermined time later, as will be discussed in more detail below. An example of circuitry that may be utilized to form the electronic circuit 250 is described in U.S. patent application Ser. No. 09/307,079 to Lile, filed on May 7, 1999, which is incorporated herein by reference.

A keeper 245 is mounted at the end of the lever 236 opposite the axis 246, and makes contact with the armature 243 when the lever 236 is rotated counterclockwise. The magnetic field generated by the coil 254 maintains the keeper 245 in contact with the armature 243 during a heating cycle so that power is applied to the electronic circuit 250. At the end of the heating cycle, as determined by the electronic circuit 250, the electronic circuit removes power from the coil to thereby release the keeper 245. The contact lever 236 is then allowed to rotate in a clockwise direction to allow the blades 239, 240 to separate from the contacts 241, 242, respectively. Electrical power is then removed from the electronic circuit 250 and the heating elements in the toaster 200.

Figure 5:
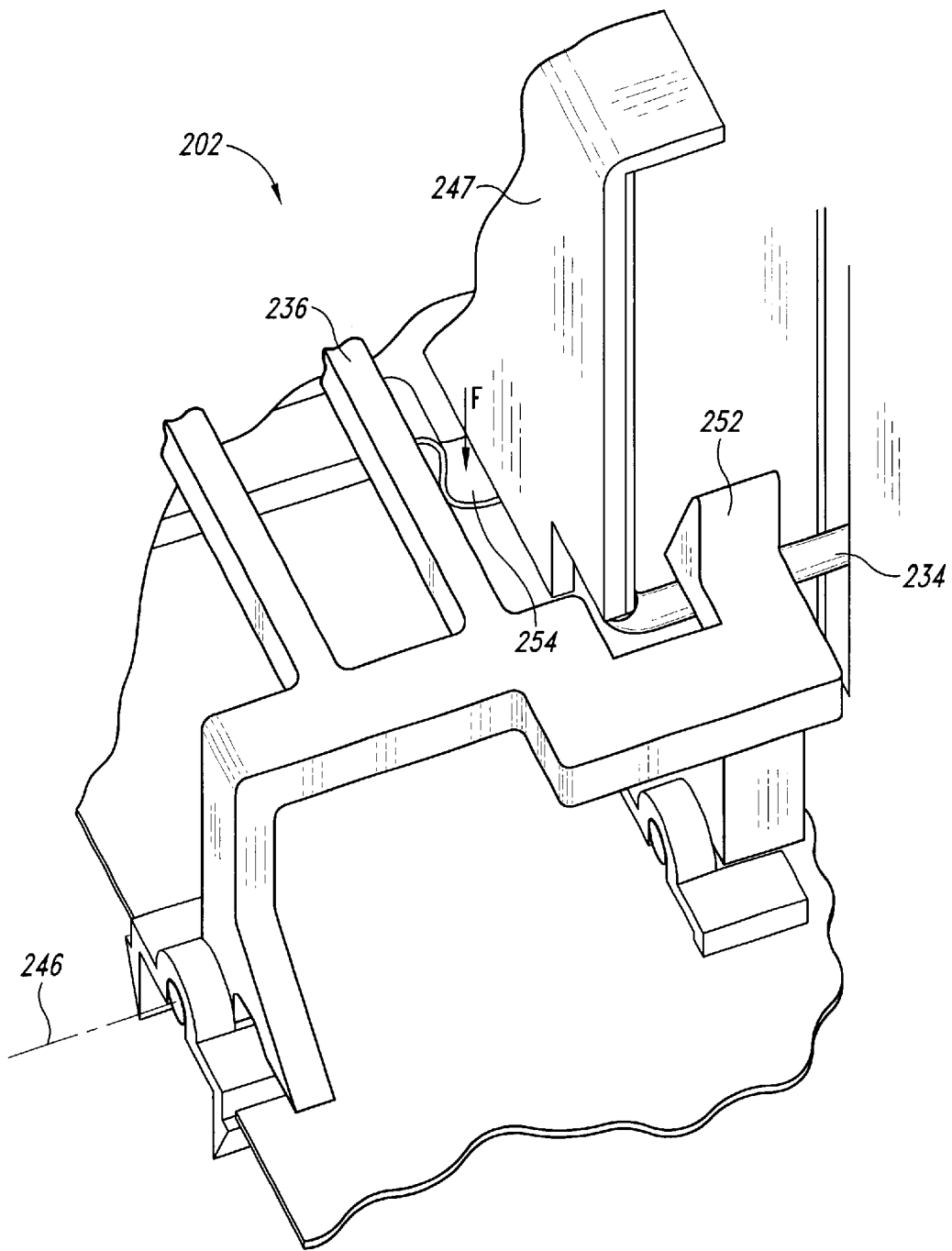
FIG. 5 is an exploded view of a portion of the switch actuating and retaining mechanism of FIG. 4.

The switch actuating and retaining mechanism 202 also operates to secure the bread supports in a lowered position during a heating cycle, as will now be explained in more detail. The contact lever 236 includes a retainer 252 formed at the end of the contact lever 236 near the axis 246. As the carriage 247 and lever 234 are lowered in response to the applied external force, the force F causes the lever 236 to rotate counterclockwise. As the lever 234 moves down, the retainer 252 moves over the lever 234 as the contact lever 236 rotates counterclockwise. In FIG. 4, the contact lever 236, retainer 252, and lever 234 are shown when the retainer 252 is not over the lever 234. Referring to FIG. 5, an exploded view of a portion of the switch actuating and retaining mechanism 202 illustrates the contact lever 236 after it has been rotated counterclockwise and the retainer 252 is positioned over the lever 234. In this situation, the retainer 252 secures the lever 234 and thus the bread supports in the lowered position during the heating cycle of the toaster. Also shown in FIG. 5 is a projection 254 extending from the contact lever 236 to under the carriage 247. As the carriage 247 is lowered in response to the applied external force, the carriage applies the force F to the projection 254 causing the contact lever 236 to rotate counterclockwise about the axis 246 as previously described.

Figure 6A:
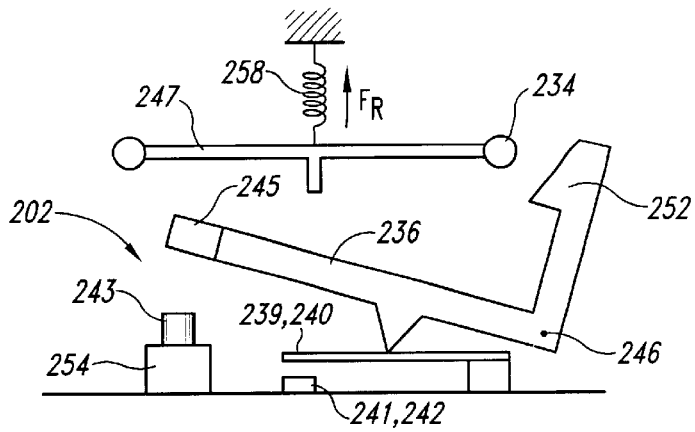
FIGS. 6A–6D are schematic diagrams illustrating the operation of the switch actuating and retaining mechanism of FIG. 4.

FIGS. 6A–6D are schematic diagrams illustrating the operation of the switch actuating and retaining mechanism 202 during a heating cycle of the toaster, as will now be explained in more detail. FIG. 6A illustrates the switch actuating and retaining mechanism 202 and carriage 247 when the toaster is turned OFF. A spring 258 applies a return force $F_R$ to the carriage 247 to position the bread supports near the top of the toaster so that a food item may be placed upon the bread supports.

Figure 6B:
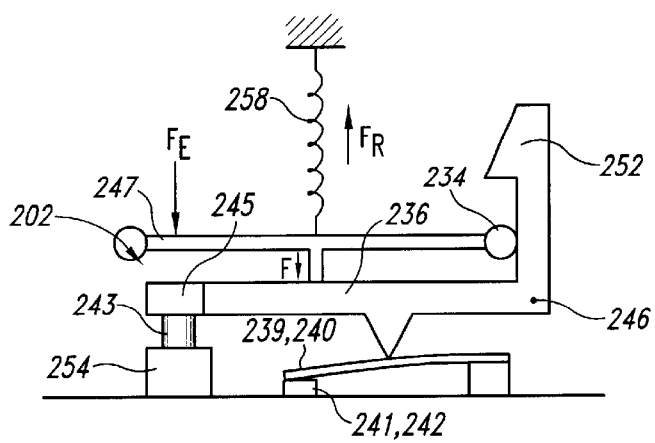
Figure 6C:
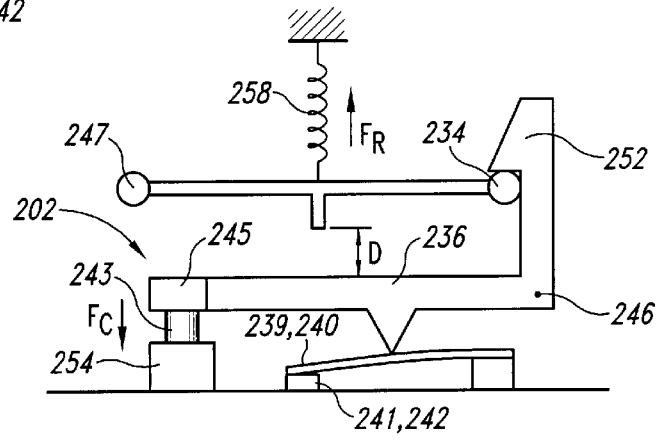

In FIG. 6B, an external force $F_E$ lowers the carriage 247 which, in turn, applies the force F to the contact lever 236. In response to the applied force F, the contact lever 236 forces the resilient blades 239, 240 against the corresponding contacts 241, 242 thereby applying power to the electronic circuit 250 and heating elements to initiate a heating cycle. At this point, the coil 254 is energized generating the magnetic field in the armature 243 to maintain the keeper 245 in contact with the armature 243. After the heating cycle is initiated, the external force $F_E$ may be removed, as shown in FIG. 6C. When the force $F_E$ is removed, the return force $F_R$ causes the carriage 247 to move a distance D towards the top of the toaster until the lever portion 234 makes contact with the retainer 252. At this point, the force $F_C$ generated in the armature 243 retains the carriage 247 in the lowered position during the heating cycle of the toaster. It should be noted that the leverage provided by the contact lever 236 greatly reduces force $F_C$ required to maintain the contact lever 236 in the desired position. In other words, the force $F_C$ generated by the coil 254 need not be greater than the return force $F_R$ as in the prior art structure because the fixed end of the contact lever 236 at the axis 246 counters the majority of the return force $F_R$ to secure the carriage 247 in the lowered position.

When the heating cycle is terminated, the electronic circuit 250 de-energizes the coil 254 thereby removing the force $F_C$ and releasing the keeper 245. When the force $F_C$ is removed, the contact lever 236 rotates clockwise about the axis 246 in response to the force from the resilient blades 239, 240 and the return force $F_R$ transferred through the lever portion 234 to the retainer 252. Once the contact lever 236 rotates far enough clockwise, the retainer 252 releases the lever portion 234 and the carriage 247 slides toward the top of the toaster. At this point, the toasted food item may be removed from the bread support and a subsequent heating cycle initiated.

Figure 6D:
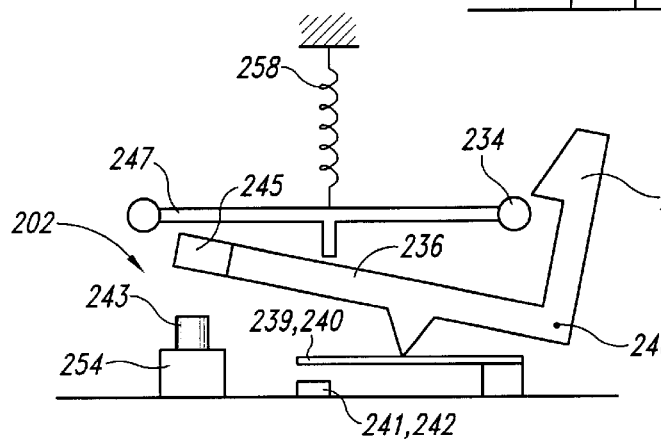

FIG. 6D illustrates operation of the switch actuating and retaining mechanism 202 when the carriage 247 gets stuck within the cooking cavity of the toaster 200 during a heating cycle. Due to the distance D between the contact lever 236 and the carriage 247, the contact lever is free to rotate clockwise about the axis 246 even when the carriage 247 is stuck. The distance D is actually between the projection 254 and the carriage 247, but is depicted as shown in FIG. 6 merely to ease explanation. The distance D allows the contact lever 236 to rotate so that the resilient blades 239, 240 are isolated from the corresponding contacts 241, 242 thereby removing power from the electronic circuit and heating element to terminate the heating cycle. In this way, the switch actuating and retaining mechanism 202 removes power from the electronic circuitry even when the carriage 247 is stuck. As previously described, this ensures that power is not continuously applied to the toaster when the carriage 247 is stuck and prevents the toaster from becoming dangerously hot.

Figure 7:
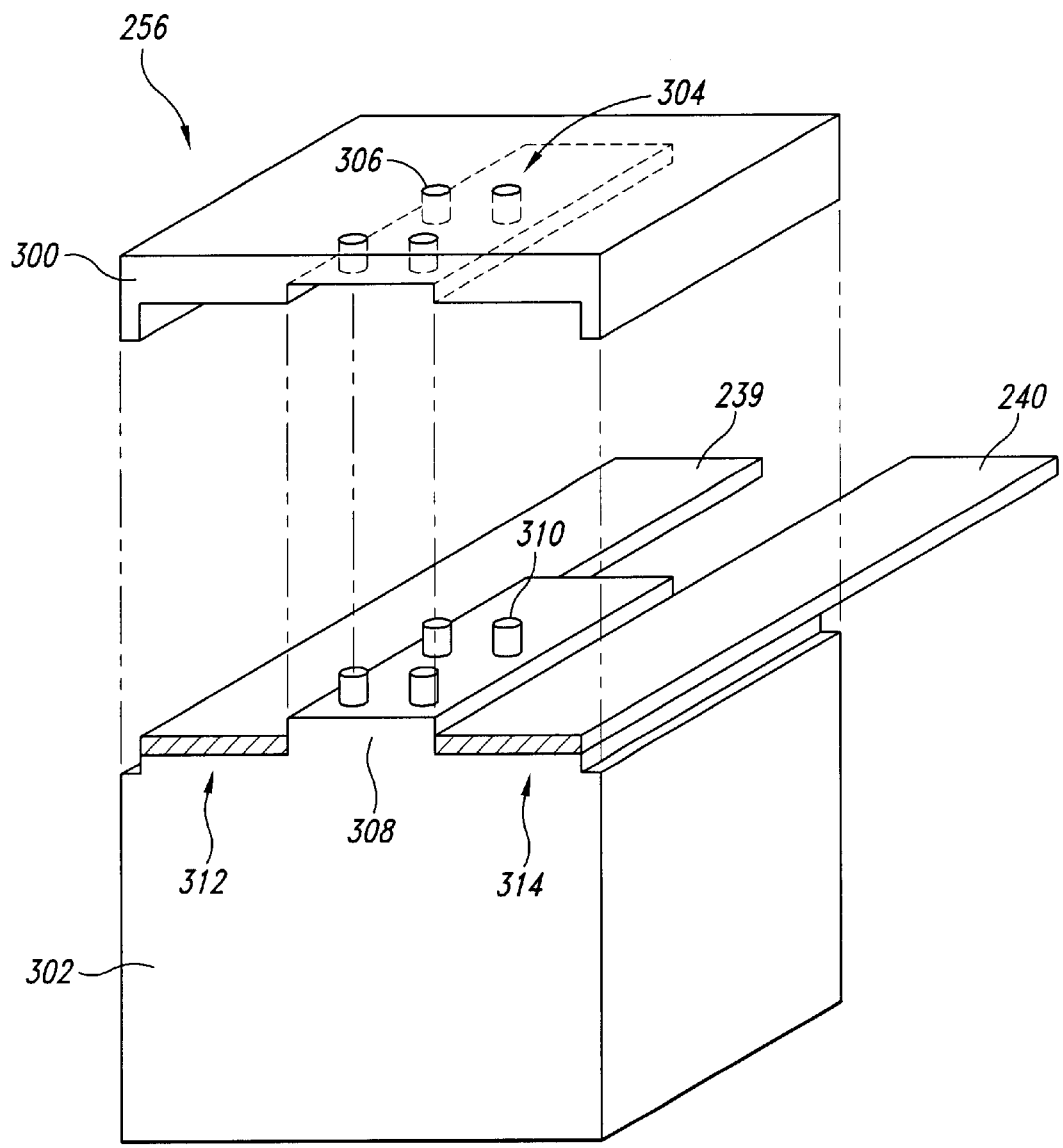
FIG. 7 is an exploded isometric view of a mounting block used in the actuating and retaining mechanism of FIG. 4.

FIG. 7 is an exploded isometric view of the mounting block 256 of FIG. 4. The mounting block 256 includes a top 300 that fits onto a bottom 302. The top 300 includes a center portion 304 including a plurality of holes 306. The bottom 302 includes a corresponding center portion 308 having a plurality of projections 310, each of the projections 310 being formed to fit into a corresponding one of the holes 306. In one embodiment, each of the projections 310 has a slightly larger diameter than the corresponding hole 306. The bottom 302 further includes side portions 312 and 314 formed to receive the resilient blades 239 and 240, respectively. To assemble the mounting block 256, the resilient blades 239 and 240 are positioned as shown and the top 300 is thereafter placed onto the bottom 302. Force is then applied to the top 300 to "snap" the top 300 into the bottom 302 to thereby secure the resilient blades 239 and 240 between the top and bottom. In another embodiment, the top 300 is "heat-staked" to the bottom 302. As understood by those skilled in the art, in heatstaking the top 300 to the bottom 302, heat is applied to the top and bottom causing them to thermally bond together. In this embodiment, the top 300 and bottom 302 are formed from compounds suitable for heat-staking. Such compounds and the process of heat-staking are understood by those skilled in the art, and thus will not be described in more detail. By heat-staking the top 300 to the bottom 302, labor and components are minimized increasing the reliability and decreasing cost of the switch actuating and retaining mechanism 202.

Figure 8:
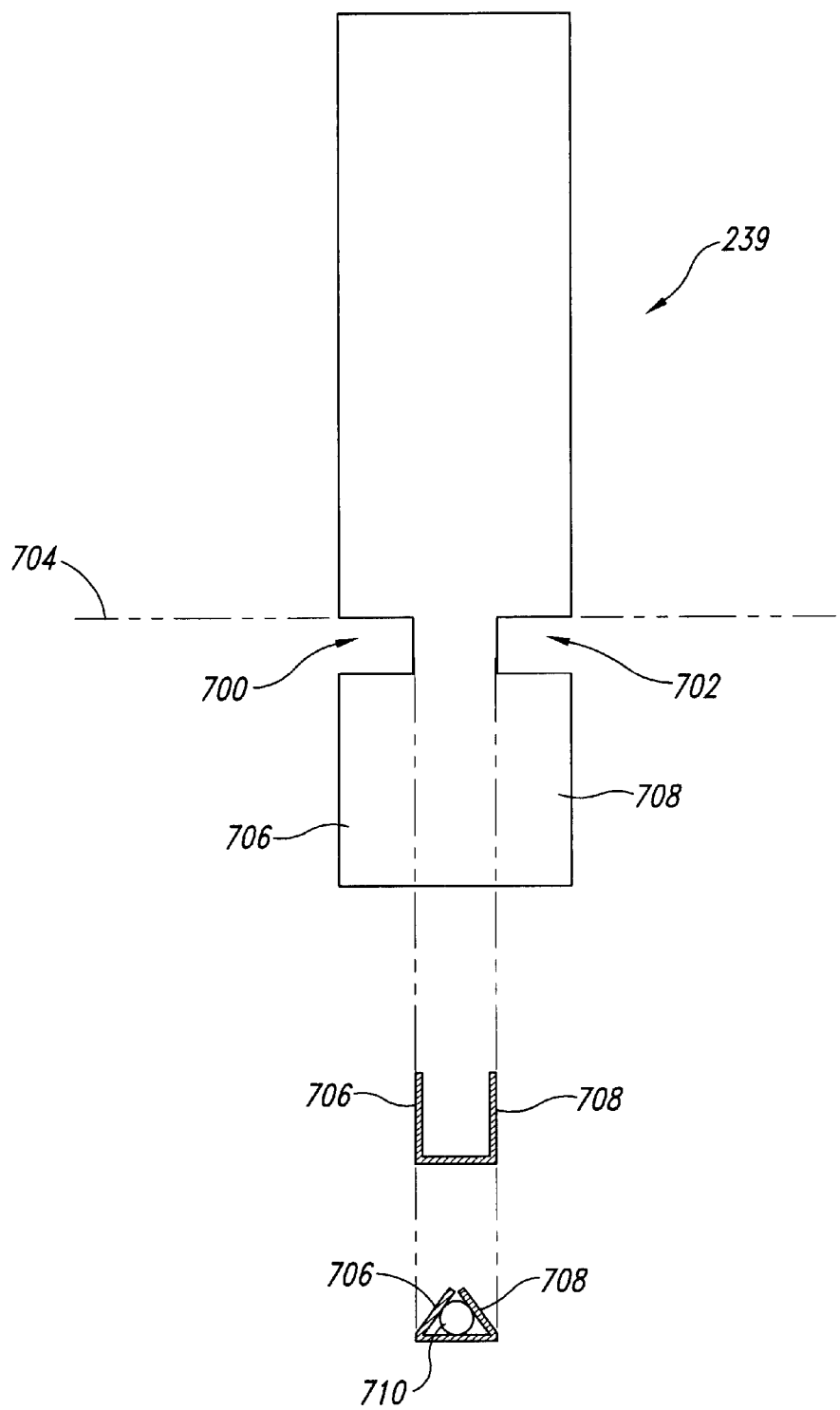
FIG. 8 is a more detailed top and cross-sectional view of one switch blade used in the actuating and retaining mechanism of FIG. 4.

FIG. 8 is a more detailed top and cross-sectional view of the resilient switch blade 239 of FIG. 4. The resilient switch blades 239 and 240 are identical, and thus for the sake of brevity only the switch blade 239 will be described in more detail with reference to FIG. 8. The resilient switch blade 239 includes two notches 700 and 702 formed in its longitudinal sides near one of its ends. The dotted line 704 corresponds approximately to the front sides of the top 300 and bottom 302 shown in FIG. 7. The notches 700 and 702 enable portions 706 and 708 to be folded up as shown in the cross-sectional view to form corresponding sides. A wire 710 may thereafter be placed between the sides 706 and 708 and the sides bent as shown to crimp the wire 710 in contact with the resilient blade 239. By forming the resilient blade 239 as shown in FIG. 8, the need for a terminal or soldering to fix the wire 710 to the resilient blade 239 is eliminated, as are the associated labor cost.

It is to be understood that although various embodiments of the present invention have been set forth in the foregoing description, the above disclosure is illustrative only, and changes may be made in detail while remaining within the broad principles of the invention. Accordingly, the invention is to be limited only by the appended claims.

What is claimed is:

1. A switching mechanism for a heating appliance including a bread support that is adapted to support a food item to insert and remove the food item from a cooking cavity of the appliance, and the appliance including an electronic circuit that controls operation during a heating cycle, the switching mechanism comprising:

a switch having a first terminal adapted to receive a power signal and a second terminal coupled to a component of the heating appliance, the switch operable responsive to an applied switching force to couple the first terminal to the second terminal;

a switch actuator having a first end, a second end, and a retaining member spaced apart from the first end, the second end being attached to the appliance to rotate about an axis, the switch actuator operable responsive to a force being applied to the bread support to rotate about the axis to a first position and apply the switching force to the switch so power is applied to the component of the heating appliance, the retaining member engaging the bread support to maintain the bread support in a lowered position in the cooking cavity when the actuator is in the first position; and a retaining mechanism applying a retaining force to the first end of the switch actuator to secure the switch actuator in the first position responsive to power being applied to the component of the heating appliance, the retaining mechanism removing the retaining force at the end of the heating cycle to allow the switch actuator to rotate about the axis to remove the switching force and thereby remove power from the component of the heating appliance.

2. The switching mechanism of claim 1 wherein the component of the heating appliance to which power is applied through the switch comprises heating elements of the heating appliance.

3. The switching mechanism of claim 1 wherein the component of the heating appliance to which power is applied through the switch comprises the electronic circuit.

4. The switching mechanism of claim 1 wherein the switch actuator further comprises a metallic keeper mounted on the first end of the actuator, and the retaining mechanism comprises an electromagnet that generates an electromagnetic force applied to the metallic keeper to hold the switch actuator in the first position.

5. The switching mechanism of claim 1 wherein the switch comprises a resilient blade and a contact coupled to the component of the heating appliance, the switch actuator applying the switching force to the resilient blade so the resilient blade touches the contact when in the first position, and the resilient blade applying a return force causing the switch actuator to rotate the axis so the resilient blade is isolated from the contact when the retaining force is removed.

6. The switching mechanism of claim 1 wherein the switch actuator comprises:
- an approximately U-shaped member including two radially extending members each having an end attached to rotate about the axis, and the U-shaped member including a base member formed between the radially extending members opposite the ends attached to rotate about the axis;
- a retaining member connected to the base portion near one of the radially extending members, the retaining member including a surface operable to engage a portion of the bread support;
- a lever member having first and second ends, the second end being connected to the base of the U-shaped member; and
- a keeper connected near the first end of the lever member.

7. The switching mechanism of claim 6 wherein the members of the switch actuator are integrally formed to form the switch actuator.

8. The switching mechanism of claim 1 wherein the bread support directly engages the switch actuator responsive to the force being applied to the bread support thereby rotating the switch actuator to the first position.

9. A switching mechanism for a heating appliance including a bread support that supports a food item to insert and remove the food item from a cooking cavity of the appliance, the switching mechanism comprising:
- a switch comprising:
  - first and second contacts mounted on a printed circuit board, each contact being electrically coupled to apply a corresponding voltage to an electronic circuit formed on the printed circuit board, and the electronic circuit controlling operation of the appliance;
  - first and second resilient blades adapted to receive respective power signals, each of the resilient blades having a first end attached to a mounting structure that is attached to the appliance, and each of the first and second blades having a second end extending over the first and second contacts, respectively, each of the resilient blades operable responsive to an applied force to bend and touch its second end to the corresponding contact;
- a switch actuator having a first end, a second end, and a retaining member near the second end, the second end being attached to the appliance to rotate about an axis, and the switch actuator operable responsive to a force being applied to the bread support to rotate about the axis to a first position and apply the switching force to the resilient blades so power is applied to the electronic circuit, the retaining member engaging the bread support to hold the bread support in a lowered positioned in the cooking cavity when the switch actuator is in the first position; and
- a retaining mechanism applying a retaining force to the first end of the switch actuator to secure the switch actuator in the first position responsive to power being applied to the electronic circuit, the retaining mechanism removing the retaining force from the first end of the switch actuator at the end of the heating cycle to allow the switch actuator to rotate about the axis to remove the switching force and thereby remove power from the electronic circuit.

10. The switching mechanism of claim 9 wherein the switch actuator further comprises a metallic keeper mounted on the first end of the actuator, and the retaining mechanism comprises an electromagnet that generates an electromagnetic force applied to the metallic keeper to hold the switch actuator in the first position.

11. The switching mechanism of claim 9 wherein the switch comprises a resilient blade and a contact coupled to the electronic circuit, the switch actuator applying the switching force to the resilient blade so the resilient blade touches the contact when in the first position, and the resilient blade applying a return force causing the switch actuator to rotate about the axis so the resilient blade is isolated from the contact when the retaining force is removed.

12. The switching mechanism of claim 9 wherein the switch actuator comprises:
- an approximately U-shaped member including two radially extending members each having an end attached to rotate about the axis, the U-shaped member including a base member formed between the radially extending members opposite the ends attached to rotate about the axis;
- a retaining member connected to the base portion near one of the radially extending members, the retaining member including a surface operable to engage a portion of the bread support;
- a lever member having first and second ends, the second end being connected to the base of the U-shaped member; and
- a keeper connected near the first end of the lever member.

13. The switching mechanism of claim 12 wherein the members of the switch actuator are integrally formed to form the switch actuator.

14. The switching mechanism of claim 9 wherein the bread support indirectly engages the switch actuator responsive to the force being applied to the bread support thereby rotating the switch actuator to the first position.

15. A heating appliance, comprising:
- a housing having a plurality of sides with a cooking cavity being defined within the sides;
- a bread support that supports a food item, the bread support being contained within the cooking cavity and operable responsive to a first force to insert the food item into the cooking cavity and operable responsive to a second force to remove the food item from the cooking cavity;
- a switching mechanism comprising:
  - a switch having first and second terminals, the switch operable responsive to an applied switching force to couple the first terminal to the second terminal to apply power to an electronic circuit that controls operation of the appliance;
  - a switch actuator having a first end, a second end, and a retaining member near the second end, and the second end being attached to the appliance to rotate about an axis, the switch actuator operable responsive to a force being applied to the bread support to rotate about the axis to a first position and apply the switching force to the switch so power is applied to the electronic circuit, the retaining member engaging the bread support to hold the bread support in a lowered position in the cooking cavity when the switch actuator is in the first position; and a retaining mechanism applying a retaining force to the first end of the switch actuator to secure the switch actuator in the first position responsive to power being applied to the electronic circuit, the retaining mechanism removing the retaining force from the switch actuator at the end of the heating cycle to allow the switch actuator to rotate about the axis to remove the switching force and thereby remove power from the electronic circuit.

16. The heating appliance of claim 15 wherein the switch actuator further comprises a metallic keeper mounted on the first end of the actuator, and the retaining mechanism comprises an electromagnet that generates an electromagnetic force applied to the metallic keeper to hold the switch actuator in the first position.

17. The heating appliance of claim 15 wherein the switch comprises a resilient blade and a contact coupled to the electronic circuit, the switch actuator applying the switching force to the resilient blade so the resilient blade touches the contact when in the first position, the resilient blade applying a return force causing the switch actuator to rotate about the axis so the resilient blade is isolated from the contact when the retaining force is removed.

18. The heating appliance of claim 15 wherein the switch actuator comprises:

an approximately U-shaped member including two radially extending members each having an end attached to rotate about the axis, the U-shaped member including a base member formed between the radially extending members opposite the ends attached to rotate about the axis;

a retaining member connected to the base portion near one of the radially extending members, the retaining member including a surface operable to engage a portion of the bread support;

a lever member having first and second ends, the second end being connected to the base of the U-shaped member; and a keeper connected near the first end of the lever member.

19. The heating appliance of claim 15 wherein the retaining member of the switch actuator is integrally formed with the switch actuator.

20. The heating appliance of claim 15 wherein the bread support indirectly engages the switch actuator responsive to the force being applied to the bread support thereby rotating the switch actuator to the first position.

21. The heating appliance of claim 15 wherein the heating appliance comprises a toaster.

22. A method for securing a bread support of a heating appliance in a desired position, the method comprising:

applying a force to the bread support to place the bread support in the desired position;

applying a retaining force through a lever arm to secure the bread support in the desired position when the lever arm is in a bread support retaining position;

using the lever arm to close a switch when the lever arm is in the bread support retaining position;

initiating a heating cycle responsive to the switch being closed;

removing the retaining force an end of the heating cycle to release the bread support at the end of a heating cycle.

23. The method of claim 22 wherein applying a retaining force comprises applying an electromagnetic force to secure the lever arm in the bread support retaining position and thereby secure the bread support in the desired position.

24. The method of claim 23, wherein the act of applying an electromagnetic force to secure the lever arm in the bread support retaining position comprises applying the electromagnetic force responsive to the switch being closed.

25. The method of claim 22 further comprising retaining the lever arm in its bread support retaining position responsive to the switch being closed.

26. A method for securing a bread support of heating appliance in a desired position, the heating appliance including a lever having first and second ends, the second end being attached to the appliance to rotate about an axis and the lever including a retaining portion formed near the second end and being adapted to hold the bread support in the desired position, the method comprising:

applying a force to the bread support to place the bread support in the desired position;

applying a force to the first end of the lever responsive to the bread support being placed in the desired position, the lever securing the bread support in the desired position when the force is applied;

initiating a heating cycle responsive to the lever being placed in a bread support retaining position in which it secures the bread support in the desired position, the lever being maintained in the bread support retaining position during the heating cycle; and removing the force applied to the first end of the lever at the conclusion of the heating cycle so the lever releases the bread support.

27. The method of claim 26 wherein applying the force to the first end of the lever comprises generating an electromagnetic force that is applied to the first end of the bread support.

28. The method of claim 27, wherein the act of applying an electromagnetic force to secure the lever in the bread support retaining position comprises applying the electromagnetic force responsive to the initiation of the heating cycle.

29. The method of claim 26 further comprising retaining the lever arm in its bread support retaining position responsive to the heating cycle being initiated.

* * * * *